(12) United States Patent
Schreiber et al.

(10) Patent No.: US 7,586,107 B2
(45) Date of Patent: Sep. 8, 2009

(54) PHOTOSENSOR-CHIP, LASER-MICROSCOPE COMPRISING A PHOTOSENSOR-CHIP AND METHOD FOR READING A PHOTOSENSOR-CHIP

(75) Inventors: Frank Schreiber, Dossenheim (DE); Volker Seyfried, Nussloch (DE)

(73) Assignee: Leica Microsystems CMS GmbH, Wetzlar (DE)

( * ) Notice: Subject to any disclaimer, the term of this patent is extended or adjusted under 35 U.S.C. 154(b) by 0 days.

(21) Appl. No.: 12/041,026

(22) Filed: Mar. 3, 2008

(65) Prior Publication Data
US 2008/0180791 A1 Jul. 31, 2008

Related U.S. Application Data

(63) Continuation of application No. PCT/EP2006/065570, filed on Aug. 22, 2006.

(30) Foreign Application Priority Data
Sep. 8, 2005 (DE) ........................ 10 2005 042 672

(51) Int. Cl.
*G01N 21/64* (2006.01)
(52) U.S. Cl. .................................................. 250/458.1
(58) Field of Classification Search ................ 348/324, 348/317, 316; 250/458.1
See application file for complete search history.

(56) References Cited
U.S. PATENT DOCUMENTS
4,674,880 A 6/1987 Seki

| 4,799,108 | A | 1/1989 | Gerner |
| 5,329,352 | A | 7/1994 | Jacobsen |
| 5,355,165 | A | 10/1994 | Kosonocky et al. |
| 6,038,023 | A | 3/2000 | Carlson et al. |
| 6,157,408 | A | 12/2000 | Etoh |
| 2004/0032651 | A1 | 2/2004 | Storz et al. |
| 2004/0090667 | A1 | 5/2004 | Gartner et al. |

OTHER PUBLICATIONS

International Search Report from International Application No. PCT/EP2006/065570, filed Aug. 22, 2006, mailed on Oct. 23, 2006.
Dussault, D. et al., "Noise performance comparison of ICCD with CCD and EMCCD cameras," Infrared Systems and Photoelectronic Technology, Proceedings of SPIE, vol. 5563, 2004, pp. 195-204, XP002401924.
English translation of International Preliminary Report on Patentability, mailed Jun. 12, 2008, from International Application No. PCT/EP2006/065570, filed Aug. 22, 2006.

*Primary Examiner*—Constantine Hannaher
(74) *Attorney, Agent, or Firm*—Houston Eliseeva LLP

(57) ABSTRACT

A photosensor chip includes a light-sensitive region with a plurality of detector elements and a light-insensitive region including a buffer memory. The light-insensitive region is at least double the light-sensitive region. A charge produced at different points in time in the detector elements is successively transferred into the buffer memory for being subsequently read out by a read-out register from the buffer memory. In one embodiment, the buffer memory includes a first and second buffer memory adjoining corresponding sides of the light-sensitive region. The first and second buffer memory can be used alternatively for buffer-storage and read-out.

38 Claims, 6 Drawing Sheets

PHOTOSENSOR-CHIP, LASER-MICROSCOPE COMPRISING A PHOTOSENSOR-CHIP AND METHOD FOR READING A PHOTOSENSOR-CHIP

RELATED APPLICATIONS

This application is a Continuation of PCT application serial number PCT/EP2006/065570 filed on Aug. 22, 2006, which, in turn, claims priority to German Patent Application No. DE 10 2005 042 672.7, filed on Sep. 8, 2005, both of which are incorporated herein by reference in its entirety.

FIELD OF THE INVENTION

The invention relates to a photosensor chip. In particular, the invention relates to a photosensor chip which has formed a light-sensitive region and a light-insensitive region.

Furthermore, the invention relates to a microscope comprising a photosensor chip. In particular, the invention relates to a microscope comprising at least a light source, which emits an illumination light beam which, through the optical unit, by means of a scanning device, illuminates a sample in a point by point manner, in a point raster-like manner or in a line by line manner, and a dispersive element, which spatially spectrally splits a detection light beam emerging from the sample and directs it onto a light-sensitive region of a photosensor chip.

Furthermore, the invention relates to a method for reading a photosensor chip. The photosensor chip has formed a light-sensitive region and a light-insensitive region.

BACKGROUND OF THE INVENTION

U.S. Pat. No. 6,038,023 discloses a system for fluorescence detection or fluorescence spectroscopy. The light coming from a sample is in this case split spectrally by means of a prism and is directed onto a detector array.

U.S. Pat. No. 4,674,880 likewise describes a spectrophotometer in which the light to be analyzed impinges on a detector having a multiplicity of detector elements.

German patent specification DE 41 11 903 discloses an invention for spectroscopy-correlated light scanning microscopy. The spectrograph contains a cooled two-dimensional CCD array, on the basis of which the measurement light is detected.

There are three essential architectures of CCD chips, namely full frame, frame transfer and interline transfer chips.

The spectrally split detection light in a laser scanning microscope is intended to be detected by means of a CCD or preferably EMCCD line detector. However, such CCD or EMCCD detectors according to the prior art are too slow with regard to the image recording rate required for many applications.

In the case of full frame chips, the complete area is used for image generation. If a finished exposed image is read out, the pixels that have not yet been read out continue to be subjected to the exposure. Without a mechanical shutter, therefore, smear effects arise.

In the case of a frame transfer chip, half of the chip area is shielded by a light-opaque mask. After exposure, the image information is completely shifted into this light-insensitive part of the chip. Since significantly less time is required for this shifting operation than for subsequently reading the chip, the smear effects are considerably reduced as a result.

A further reduction of the smear effect is realized in the case of interline transfer chips. In the latter, every second column of the chip is masked in light-opaque fashion. After exposure, the image only has to be shifted by one column width.

In the case of full frame chips, the minimum time between two successive exposure operations, the so-called image separation, is generally equal to the read-out time of the image information from the chip. Both in the case of frame transfer chips and in the case of interline transfer chips, the time between two successive exposures can be shorter at most once than the time required for reading out the image information. In a time series having more than two images, in these chips, too, the minimum separation between two successive exposures is equal to the read-out time of the respective data from the masked regions.

The design of frame transfer and interline transfer chips is optimized toward avoiding smear effects that can arise during the operation of reading out the image information items. The minimum separation between successive exposures, i.e. the image separation and thus also ultimately the image repetition rate, is not influenced by the design of said chips.

SUMMARY OF THE INVENTION

The invention is based on the object, for a given clock rate of the CCD chip and a given number of read-out registers, of reducing the minimum separation between successive exposure times, or of increasing the image recording rate of a photosensor chip.

The object is achieved by means of a photosensor chip comprising the features of claim 1.

The invention is furthermore based on the object of providing a microscope with which, for a given clock rate and number of read-out registers, the image separation is reduced or the image recording rate of a photosensor chip is increased.

The objective object is achieved by means of a microscope comprising the features of patent claim 12.

In addition, the invention is based on the object of providing a method by which, for a given clock rate and number of read-out registers, the minimum image separation is reduced or the image recording rate of a photosensor chip is increased.

The objective object is achieved by means of a method comprising the features of patent claim 25.

It goes without saying that the image recording rate can be increased further by reducing the read-out time if possible (e.g. by means of a higher clock rate or a plurality of read-out registers arranged in parallel).

It is advantageous to configure a photosensor chip in such a way that the light-insensitive region occupies an area corresponding to at least twice the area of the light-sensitive region.

It is furthermore advantageous to use said photosensor chip in a microscope. The microscope is provided with at least one light source, which emits an illumination light beam which, through the optical unit, by means of a scanning device, illuminates a sample in a point by point manner, in a point raster by point raster manner or in a line by line manner. A dispersive element is arranged in the beam path, which element spatially spectrally splits a detection light beam emerging from the sample and directs it onto a light-sensitive region of the photosensor chip. The photosensor chip is configured in such a way that a light-insensitive region is formed in addition to the light-sensitive region, wherein the light-insensitive region occupies an area corresponding to at least twice the area of the light-sensitive region.

Moreover, the method for reading a photosensor chip is advantageous in which the photosensor chip has formed a light-sensitive region and a light-insensitive region, and wherein the method comprises the following steps. The light-insensitive region is formed with an area corresponding to at least twice the area of the light-sensitive region. The charge produced at different points in time in the detector elements of the photosensor chip of the light-sensitive region is successively transferred into at least one buffer memory region in the light-insensitive region on the photosensor chip. The information is subsequently read out from there.

The light-sensitive region can be formed as a line detector, and at least two light-insensitive lines can be provided as buffer memory.

A further embodiment of the photosensor chip is for the number of lines of the buffer memory to correspond to a number of individual detector elements of the photosensor chip in the light-sensitive line.

The light-sensitive line can be assigned a first and a second buffer memory on both sides.

In a further embodiment, the light-sensitive region of the photosensor chip can comprise a block comprising at least two lines, and wherein the light-insensitive buffer memory comprises a plurality of blocks each comprising the same number of light-insensitive lines as the block of light-sensitive lines. Of course, said plurality of blocks can physically be realized as a single, correspondingly large block, but is operated in terms of function in a manner corresponding to a plurality of blocks.

The light-insensitive region of the detector preferably has an area that covers more than three quarters of the area of the detector. The photosensor chip is a CCD chip, CMOS chip or particularly advantageously an EMCCD chip. Further advantageous configurations of the invention can be gathered from the subclaims.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

Figure 1:
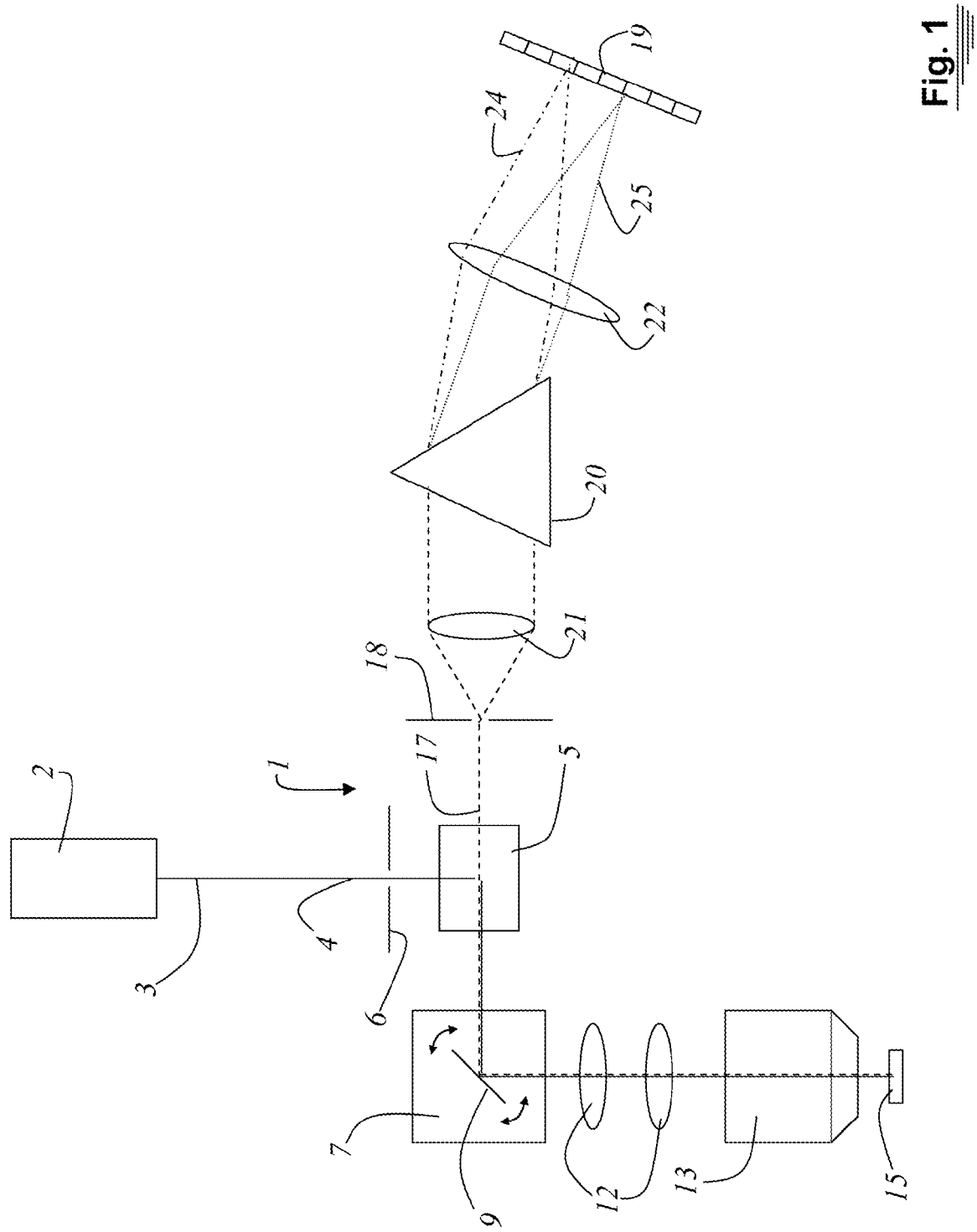
FIG. 1 shows a schematic illustration of a scanning microscope with a photosensor chip for picking up the signals from the detection light.

FIG. 1 shows the schematic construction of a confocal scanning microscope 1 in which the device according to the invention of the photosensor chip 19 is used. The illumination light beam 3 coming from at least one illumination system 2 is directed to a scanning device 7 by a beam splitter or a suitable deflection means 5. Before the illumination light beam 3 impinges on the deflection means 5, it passes through an illumination pinhole 6. The scanning device 7 comprises a cardanically suspended scanning mirror 9, which guides the illumination light beam 3 through a scanning optical unit 12 and a microscope optical unit 13 over or through an object 15. In the case of non-transparent objects 15, the illumination light beam 3 is guided over the object surface. In the case of biological objects 15 (specimens) or transparent objects, the illumination light beam 3 can also be guided through the object 15. For these purposes, non-luminous specimens are prepared if appropriate with a suitable dye (not illustrated since this is established prior art). The dyes present in the object 15 are excited by the illumination light beam 3 and emit light in a characteristic region of the spectrum that is specific to them. This light emerging from the object 15 defines a detection light beam 17. The latter passes through the microscope optical unit 13, the scanning optical unit 12 and via the scanning module 7 to the deflection means 5, passes through the latter and passes via a detection pinhole 18 onto at least one photosensor chip 19, which is embodied as a CCD chip or EMCCD chip. The detection light beam 17 that emerges from or is defined by the object 15 is illustrated as a dashed line in FIG. 1. Electrical detection signals that are largely proportional to the power of the light emerging from the object 15 are generated in the photosensor chip 19. Since, as already mentioned above, the object 15 emits light of not just one wavelength, it is expedient to arrange a dispersive element 20 upstream of the photosensor chip 19. The dispersive element 20 spectrally splits the detection light beam, such that the individual wavelengths of the detection light are spatially spectrally separated. Disposed upstream of the dispersive element 20 is a lens 21, which expands and parallelizes the detection light beam 17. Disposed downstream of the dispersive element 20 is a further lens 22, which focuses the spectrally separated beams 24, 25 of the detection light beam 17 onto the photosensor chip 19. The spectrally separated beams 24, 25 differ with regard to their wavelength and therefore impinge on different regions on the photosensor chip 19.

Figure 2:
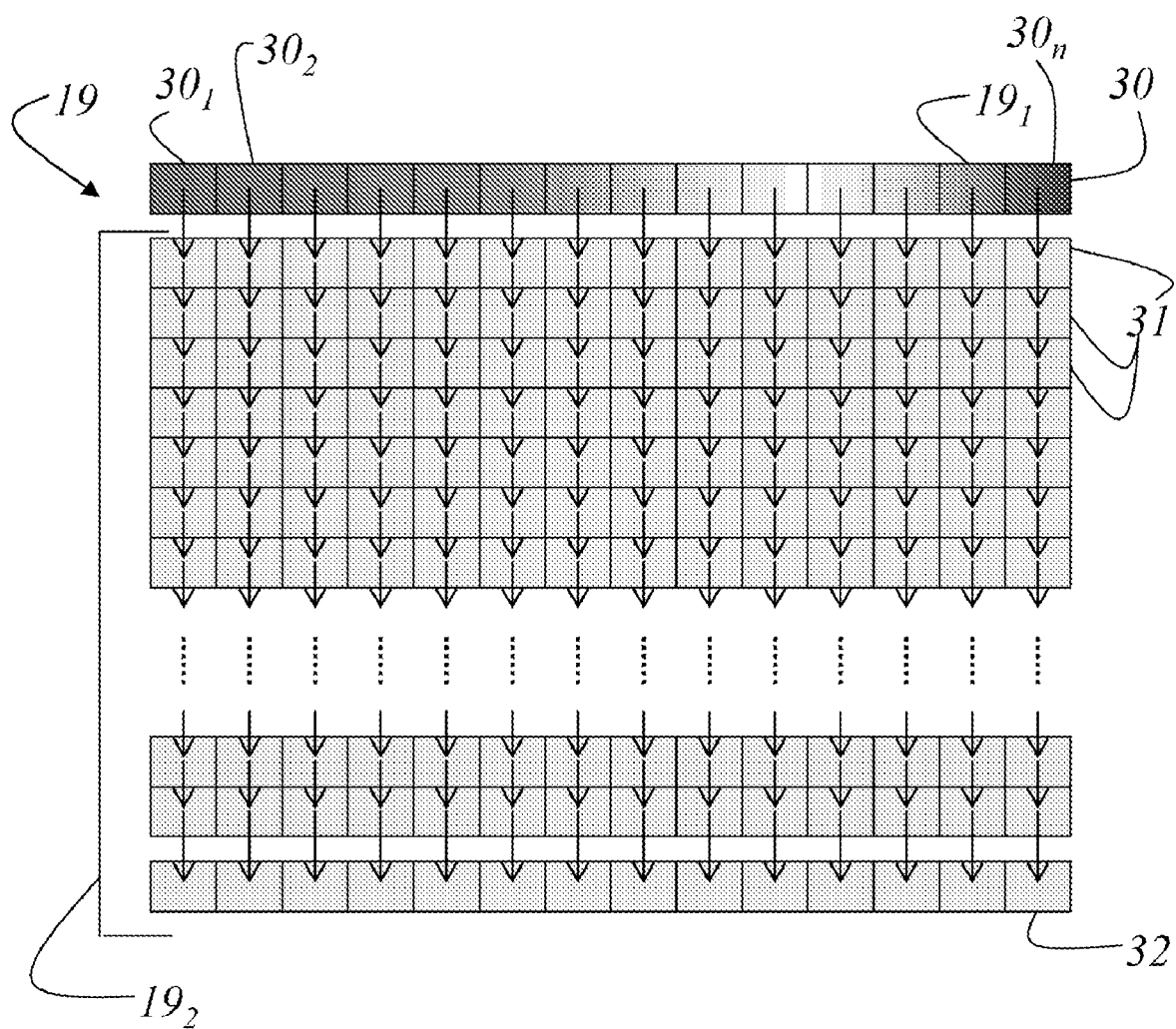
FIG. 2 shows a schematic illustration of the photosensor chip with a detector line and with a buffer memory.

FIG. 2 shows a schematic illustration of the photosensor chip 19 with a detector line 30 and with a buffer memory 31. The photosensor chip 19 has formed a light-sensitive region $19_1$ and a light-insensitive region $19_2$. The light-insensitive region $19_2$ occupies an area corresponding to at least twice an area of the light-sensitive region $19_1$. The detector line 30 is formed in the light-sensitive region $19_1$, and the buffer memory 31 is formed in the light-insensitive region $19_2$. In the case of the design of a detector according to the invention, the photosensor chip 19 is formed as a CCD chip or EMCCD chip. The area of the light-insensitive or light-opaque region $19_2$ is larger by a multiple than the area of the light-sensitive or light-sensitive region $19_1$. This means that the image information from the light-sensitive region $19_1$ can be shifted into the light-insensitive region $19_2$ more than once before the data are read out from the photosensor chip 19. The light-insensitive region $19_2$ therefore functions as a fast buffer memory. In this method, the minimum exposure time is reduced to the time required to shift the data from the light-sensitive region $19_1$ into the light-insensitive region $19_2$ (buffer memory). The minimum exposure time is therefore independent of the read-out time. The number of images which can be buffer-stored is given by the ratio between the size of the buffer memory 31 and the detector line 30 of the light-sensitive region $19_1$ of the photosensor chip 19. Since a photosensor chip 19, such as e.g. the CCD chip or the EMCCD chip, cannot be made arbitrarily large, the invention is particularly advantageous for detectors having a small light-sensitive area or a small light-sensitive region $19_1$ (e.g. line detectors). Advantages are already afforded if the buffer memory is greater than or equal to double the region or area of the light-sensitive region $19_1$.

In one preferred embodiment of the photosensor chip 19, the light-sensitive region $19_1$ is formed as a line detector and finds application in a laser scanning microscope. In this case, the number of lines of the buffer memory 31 on the photosensor chip 19 corresponds to the maximum number of pixels in the confocal image. The data are read out from the buffer memory 31 between the recording of two scanning lines. Depending on the pause between the scanning lines, the exposure times per detector element $30_1, 30_2, \ldots, 30_n$ can be greatly shortened with the photosensor chip 19 according to the invention. In the case of unidirectional scanning with the microscope and a duty ratio of a quarter, the possible exposure time is thereby shortened by a factor of 7. The read-out is effected in read-out register 32.

Figure 3:
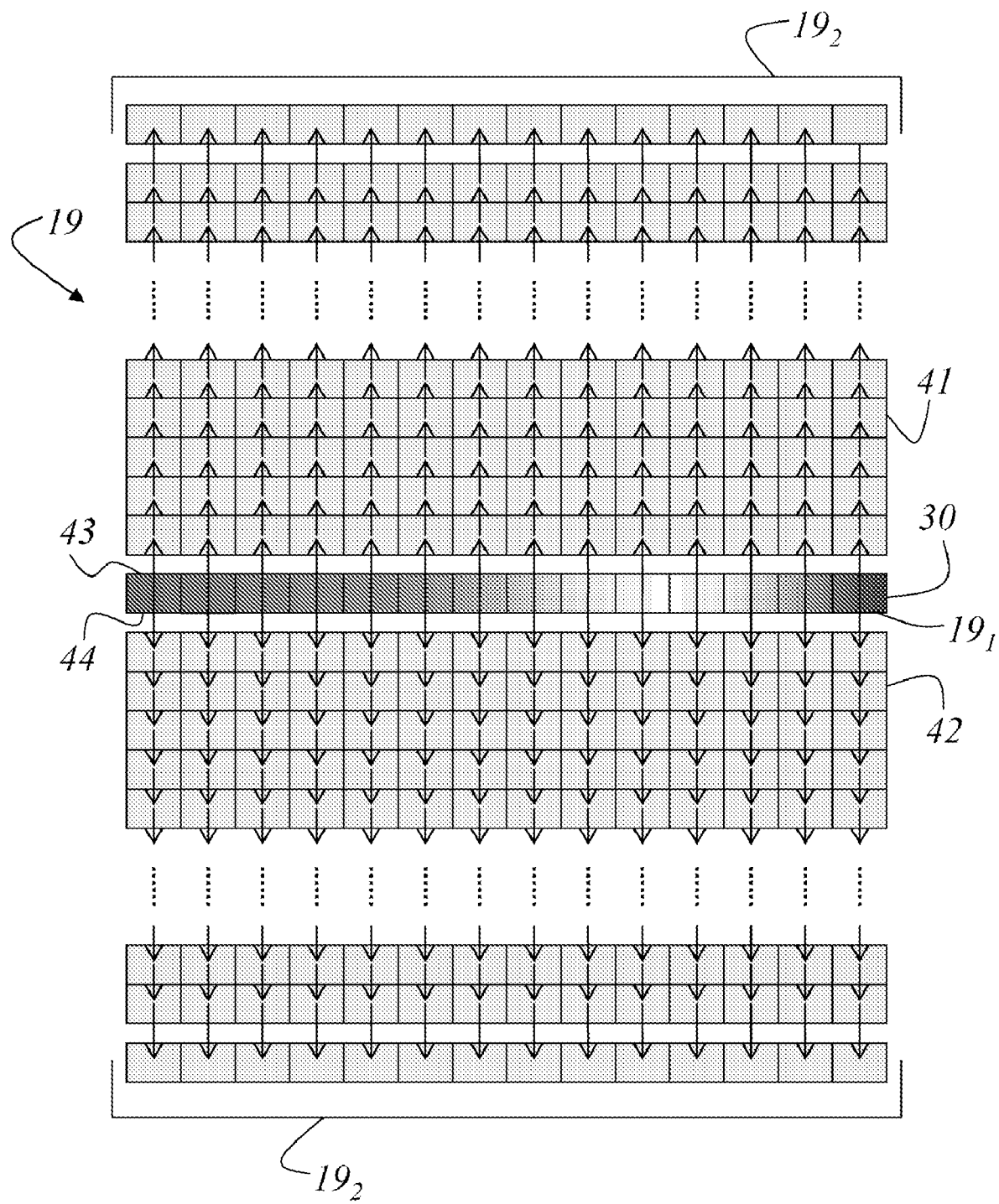
FIG. 3 shows a schematic illustration of the photosensor chip with a detector line with two buffer memories.

FIG. 3 shows a schematic illustration of the photosensor chip 19 with a detector line 30 with a first buffer memory 41 and a second buffer memory 42. This arrangement constitutes a particularly advantageous variant of the buffer memory according to the invention. The first buffer memory 41 is arranged on one side 43 of the detector line 30 and the second buffer memory 42 is arranged on the other side 44 of the detector line 30. The data from the light-sensitive region $19_1$ of the photosensor chip 19 can therefore be written to more than one buffer memory 41, 42. Consequently, it is possible to read out the data from the first buffer memory 41 while further data are simultaneously being written to the second buffer memory 42. By virtue of this configuration, the same specifications are achieved with an overall smaller buffer memory than in comparison with the configuration having only one buffer memory.

Figure 4:
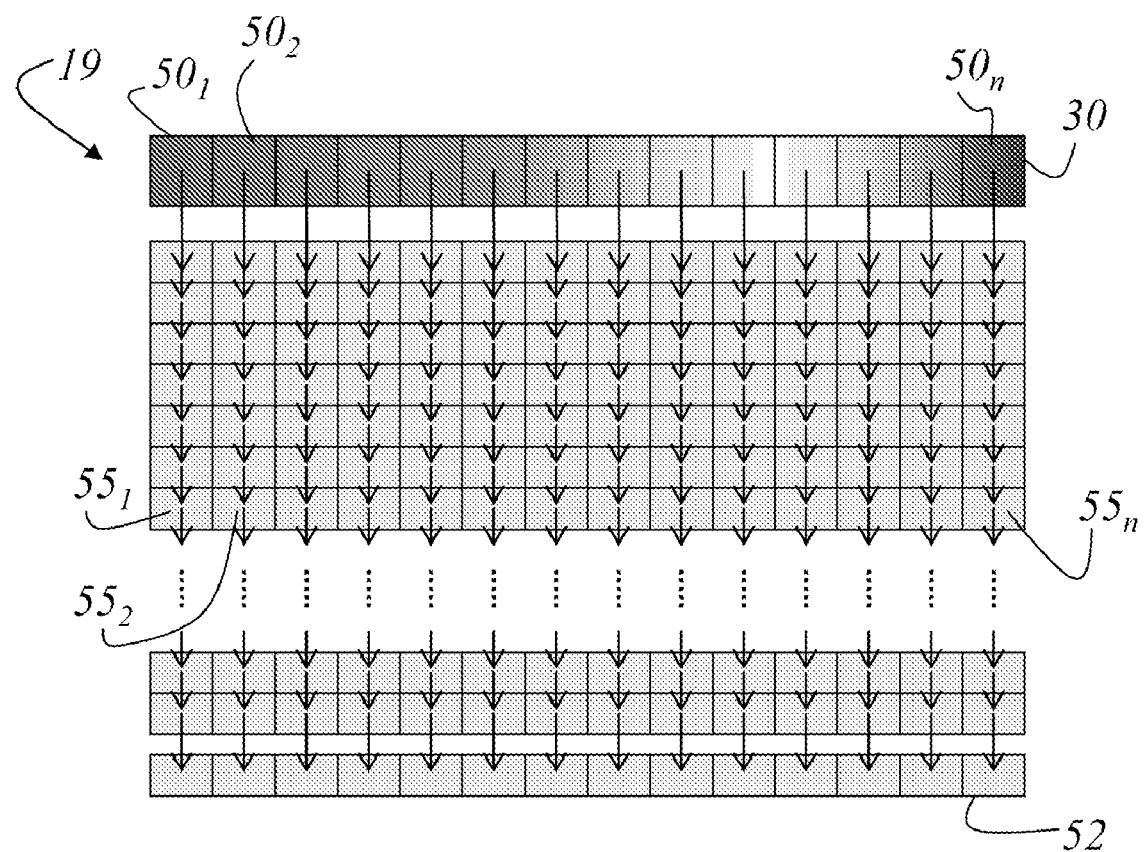
FIG. 4 shows a schematic illustration of the photosensor chip with a detector line and a buffer memory with non-square pixels.

FIG. 4 shows a schematic illustration of the photosensor chip 19 with a detector line 30 comprising light-sensitive pixels $50_1, 50_2, \ldots, 50_n$ and a buffer memory having non-square light-insensitive elements $55_1, 55_2, \ldots 55_n$ (pixels). The arrangement described here corresponds to the arrangement from FIG. 2. In order to reduce the area of the photosensor chip 19 and to minimize the transfer times, the elements in the buffer memory are configured in non-square fashion. The read-out is effected in read-out register 52.

Figure 5:
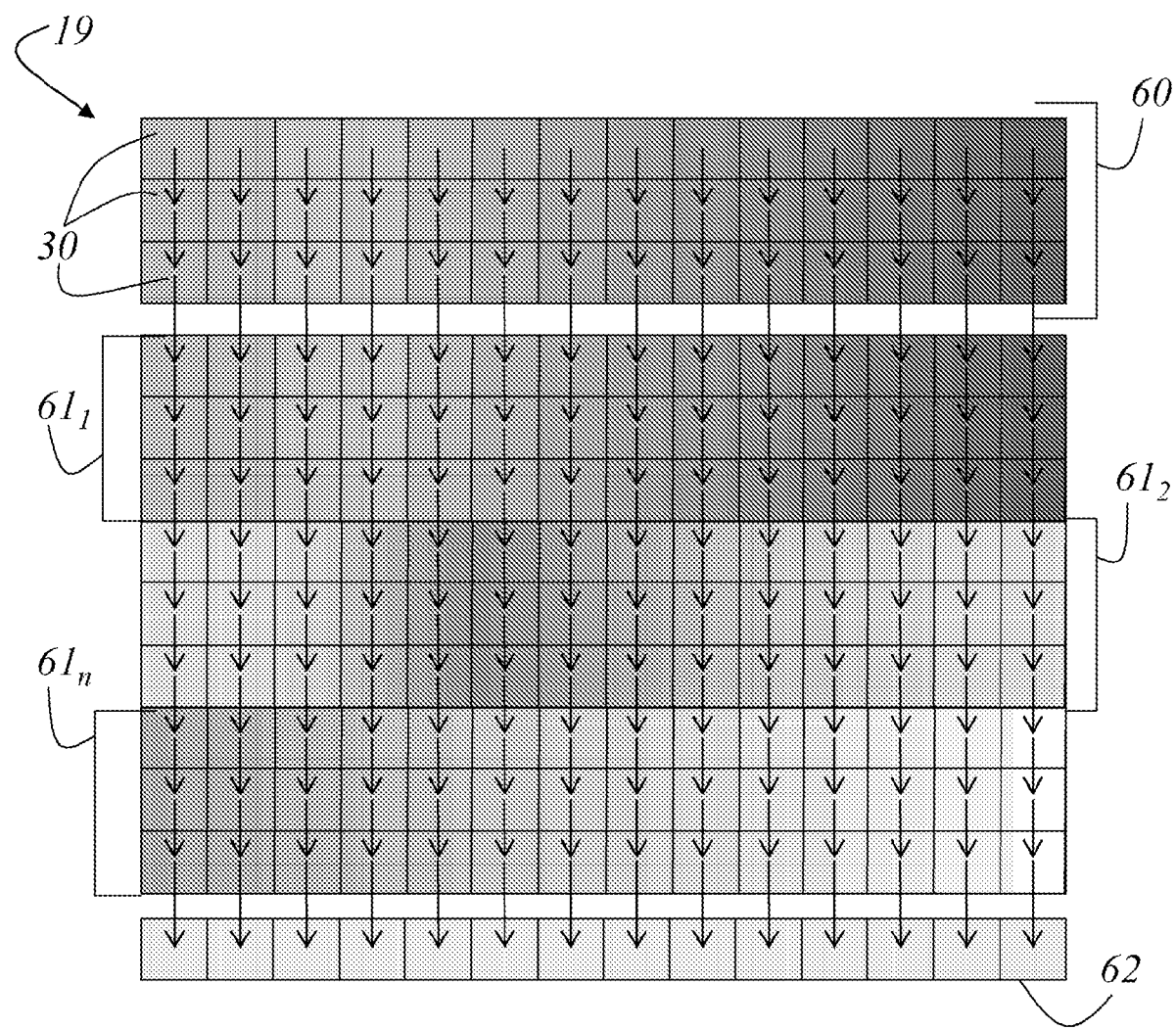
FIG. 5 shows a schematic illustration of the photosensor chip with a detector region comprising a plurality of detector lines and with likewise arranged buffer memories block by block.

FIG. 5 is a schematic illustration of the photosensor chip 19 with a detector region 60 comprising a plurality of detector lines 30 and with likewise arranged buffer memory blocks $61_1, 61_2, \ldots, 61_n$. The arrangement described here corresponds to the arrangement from FIG. 2 with the difference that the light-sensitive region $19_1$ comprises a plurality of detector lines 30. The light-insensitive region $19_2$ (buffer memory), is constructed from a plurality of buffer memory blocks $61_1, 61_2, \ldots, 61_n$, each of which is constructed from N buffer memory lines 30, wherein the number N corresponds to the number of detector lines 30 in the light-sensitive region $19_1$. The light-sensitive region $19_1$ is formed as an area detector with corresponding buffer memories block by block. The read-out is effected in read-out register 62.

Figure 6:
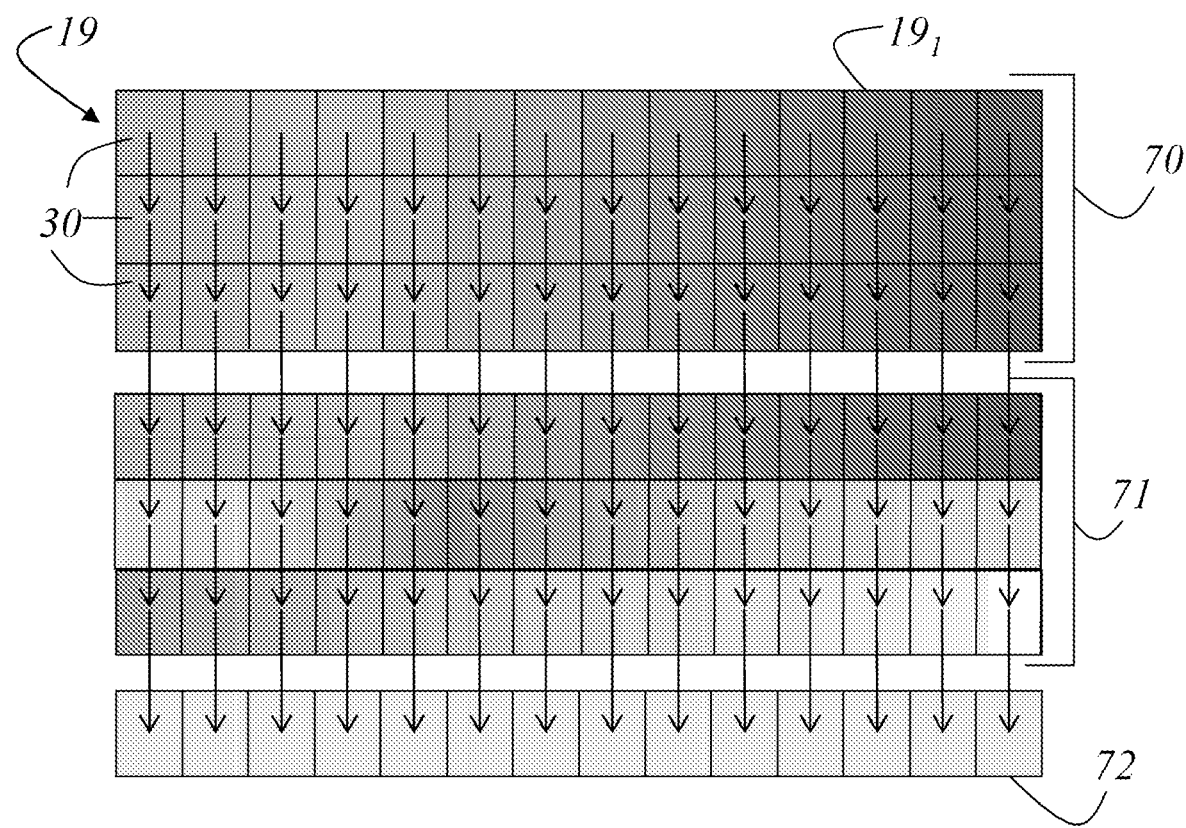
FIG. 6 shows a schematic illustration of the photosensor chip with a detector region comprising a plurality of detector lines and with binning in the buffer memory.

FIG. 6 shows a schematic illustration of the photosensor chip 19 with a detector region 70 comprising a plurality of detector lines 30 and with binning in the buffer memory 71.

The information from the light-sensitive region $19_1$ is compressed in the buffer memory 71 by binning prior to read-out. The read-out is effected in read-out register 72.

The use of the photosensor chip 19 with buffer memory as a spectral detection unit in a laser scanning microscope, see FIG. 1, in conjunction with a dispersive element, such as e.g. prism, grating, hologram, enables rapid spectral detection of the signals from the microscope. The photosensor chip 19 according to the invention is arranged in or near the focal plane. The data are read out in particular from the photosensor chip 19, which comprises a detector line 30 or is an area detector, wherein the read-out is effected with binning. The storage register is read during the points in time at which no light is incident on the detector (e.g. during the reversal of the scanning module 7 (or of the galvos) in the laser scanning microscope or during laser blanking.

The light-insensitive region $19_2$ of the photosensor chip 19, representing the buffer memory, is realized by a light-opaque mask on the chip. The light-opaque mask covers more than three quarters of the area of the photosensor chip 19. For noise reduction purposes, the buffer memory or the entire CCD/EMCCD chip can be cooled by Peltier, liquid, air or multi-stage cooling or comparable means.

By virtue of the arrangement of detector elements and storage elements on the photosensor chip 19, simultaneous reading out of image information items from a buffer memory and shifting of image information items into a second or further buffer memory are effected. The buffer memory of the photosensor chip 19 formed as a CCD chip can be read by a plurality of read-out registers. A plurality of electron-multiplying amplifier registers can be disposed downstream of the read-out registers of the photosensor chip 19 formed as an EMCCD chip.

The type of storage is effected depending on the configuration of the photosensor chip 19. In the case of a photosensor chip 19 having a detector line 30, the image information of a scanning line (of the confocal image), is stored in the buffer memory 31 of the CCD chip or EMCCD chip. Likewise, the image information of a scanning region (in the confocal image) can be stored in the buffer memory of the CCD chip or EMCCD chip. The image information of a time series (measured at one point in the confocal image) can likewise be stored in the buffer memory of a CCD chip or EMCCD chip.

In general, the buffer memory is read during the line flyback (in the confocal image). In the case of a light-sensitive region $19_1$ of more than one detector line, the buffer memory is read during the frame flyback (in the confocal image).

The buffer memory is composed of memory elements (pixels) having a different size than the light-sensitive region $19_1$ of the CCD chip or EMCCD chip. In order to minimize the chip area and the transfer times, the pixels in the buffer memory are configured in non-square fashion (in this respect see FIG. 4).

While this invention has been particularly shown and described with references to preferred embodiments thereof, it will be understood by those skilled in the art that various changes in form and details may be made therein without departing from the scope of the invention encompassed by the appended claims.

What is claimed is:
1. A photosensor chip comprising:
    a light-sensitive region comprising a plurality of detector elements; and
    a light-insensitive region adjoining the light-sensitive region;

wherein the light-insensitive region comprises a buffer memory and occupies an area corresponding to at least twice an area of the light-sensitive region;

wherein a charge produced at different points in time in the detector elements is successively transferred into the buffer memory for being subsequently read out by a read-out register from the buffer memory.

2. The photosensor chip according to claim 1, wherein the light-sensitive region is a line detector, and wherein the buffer memory comprises at least two lines.

3. The photosensor chip according to claim 2, wherein the number of lines in the buffer memory corresponds to a number of individual detector elements in the plurality of detector elements.

4. The photosensor chip according to claim 1, wherein the buffer memory of the light-insensitive region comprises a first buffer memory adjoining one side of the light-sensitive region and a second buffer memory adjoining another side of the light-sensitive region, wherein the light-sensitive region is assigned the first portion of the buffer memory and the second portion of the buffer memory.

5. The photosensor chip according to claim 1, wherein the light-sensitive region is an area detector and comprises a block comprising at least two lines, wherein the buffer memory comprises a plurality of blocks each comprising the same number of lines as the block of the light-sensitive region.

6. The photosensor chip according to claim 5, wherein at least a first block of the plurality of blocks of the buffer memory is arranged on one side of the light-sensitive block, and wherein at least a second block of the plurality of blocks of the buffer memory is arranged on the other side of the light-sensitive block.

7. The photosensor chip according to claim 1, wherein the area occupied by the light-insensitive region covers more than three quarters of an area of the photosensor chip.

8. The photosensor chip according to claim 1, wherein photosensor chip is a CCD chip or an EMCCD chip.

9. The photosensor chip according to claim 8, further comprising cooling means for cooling the CCD chip or the EMCCD chip for noise reduction purposes, wherein the cooling is a Peltier cooling, a liquid cooling, an air cooling or a multistage cooling.

10. The photosensor chip according to claim 8, wherein a read-out register of the EMCCD comprises more than one amplifier registers.

11. The photosensor chip according to claim 1, further comprising more than one read-out register.

12. A microscope comprising:
    at least one light source for emitting an illumination light beam for illuminating a sample in a point by point manner, in a point raster-like manner, or in a line by line manner;
    an optical unit;
    a scanning device;
    a photosensor chip; and
    a dispersive element for spatially spectrally splitting a detection light beam emerging from the sample and directing the detection light beam such that it is incident onto a light-sensitive region of the photosensor chip;
    wherein the photosensor chip further comprises a light-insensitive region comprising detector elements,
    wherein the light-insensitive region comprises a buffer memory and occupies an area corresponding to at least twice an area of the light-sensitive region; and
    wherein a charge produced at different points in time in the detector elements is successively transferred into the buffer memory for being subsequently read out by a read-out register from the buffer memory.

13. The microscope according to claim 12, wherein the light-sensitive region is a line detector, and wherein the buffer memory of the light-insensitive region comprises at least two lines.

14. The microscope according to claim 13, wherein the line detector comprises a plurality of individual detector elements, and wherein the number of lines in the buffer memory corresponds to the number of individual detector elements in the line detector.

15. The microscope according to claim 13, wherein the buffer memory comprises a first buffer memory and a second buffer memory, and wherein the light-sensitive line is assigned the first buffer memory and the second buffer memory.

16. The microscope according to claim 12, wherein the light-sensitive region of the photosensor chip comprises a block comprising at least two lines, and wherein the buffer memory comprises a plurality of blocks each comprising the same number of lines as the block of the light-sensitive region.

17. The microscope according to claim 16, wherein at least a first block of the plurality of blocks of the buffer memory is arranged on one side of the light-sensitive block, and wherein at least a second block of the plurality of blocks of the buffer memory is arranged on another side of the light-sensitive block.

18. The microscope according to claim 12, wherein the area occupied by the light-insensitive region covers more than three quarters of an area of the photosensor chip.

19. The microscope according to claim 12, wherein the photosensor chip is a CCD detector or an EMCCD.

20. The microscope according to claim 19, wherein the buffer memory of the CCD detector comprises more than one read-out register.

21. The microscope according to claim 19, wherein a read-out register or read-out registers of the EMCCD comprise more than one amplifier register.

22. The microscope according to claim 12, further comprising cooling means for cooling the CCD detector or the EMCCD chip for noise reduction purposes, and wherein the cooling means is a Peltier cooling, a liquid cooling, an air cooling or a multistage cooling.

23. The microscope according to claim 12, wherein the buffer memory is read out during points in time at which no light is incident on the light-sensitive region of the photosensor chip.

24. The microscope according to claim 23, wherein times at which no light is incident on the light-sensitive region of the photosensor chip comprise a reversal of the scanning device of the microscope or laser blanking.

25. A method for reading a photosensor chip, wherein the photosensor chip comprises a light-sensitive region and a light-insensitive region, comprising the steps of:
    forming the light-insensitive region with an area corresponding to at least twice an area of the light-sensitive region,
    producing a charge at different points in time in detector elements of the light-sensitive region by means of light incident onto the light-sensitive region,
    successively transferring the charge produced at different points in time in detector elements of the light-sensitive region into a buffer memory of the light-insensitive region of the photosensor chip, and
    subsequently reading out the buffer memory.

26. The method according to claim 25, wherein the light-sensitive region is a line detector, and wherein the buffer memory comprises at least two light-insensitive lines, and wherein a series of image information items is stored in the buffer memory of the photosensor chip.

27. The method according to claim 26, wherein the light-sensitive region comprises a plurality of individual detector elements, and wherein the number of lines of the buffer memory corresponds to the number of individual detector elements in the light-sensitive region.

28. The method according to claim 25, wherein the buffer memory comprises at least a first buffer memory and at least a second buffer memory, and wherein the light-sensitive line is assigned at least the first buffer memory and at least the second buffer memory.

29. The method according to claim 25, wherein the light-sensitive region of the photosensor chip is formed as a block comprising at least two lines, and wherein the buffer memory is formed as a plurality of blocks each comprising a same number of light-insensitive lines as the block of the light-sensitive region.

30. The method according to claim 29, wherein the plurality of blocks of the buffer memory comprises at least a first block of light-insensitive lines arranged on one side of the light-sensitive block, and at least a second block of light-insensitive lines arranged on another side of the light-sensitive block.

31. The method according to claim 25, wherein the photosensor chip is a CCD detector or an EMCCD.

32. The method according to claim 31, further comprising the step of cooling the CCD chip or the EMCCD chip for noise reduction purposes, wherein the cooling is a Peltier cooling, a liquid cooling, an air cooling or a multistage cooling.

33. The method according to claim 32, wherein the read-out register or read-out registers of the EMCCD is or are provided with more than one amplifier register.

34. The method according to claim 33, wherein the at least first block of light-insensitive lines and the at least second block of light-insensitive lines are used alternatively for buffer-storage and read-out, wherein the at least first and second blocks of light-insensitive lines comprise the same number of light-insensitive lines.

35. The method according to claim 31, wherein the buffer memory of the CCD detector is provided with more than one read-out register.

36. The method according to claim 25, wherein the reading out the at least one buffer memory is carried out during times at which no light is incident on the light-sensitive region of the photosensor chip.

37. The method according to claim 25, wherein the reading of the buffer memory is carried out during a line flyback of a scanning device of a scanning microscope.

38. The method according to claim 25, wherein the reading of the buffer memory is carried out during a frame flyback of a scanning device of a scanning microscope.

* * * * *